Figure 1:
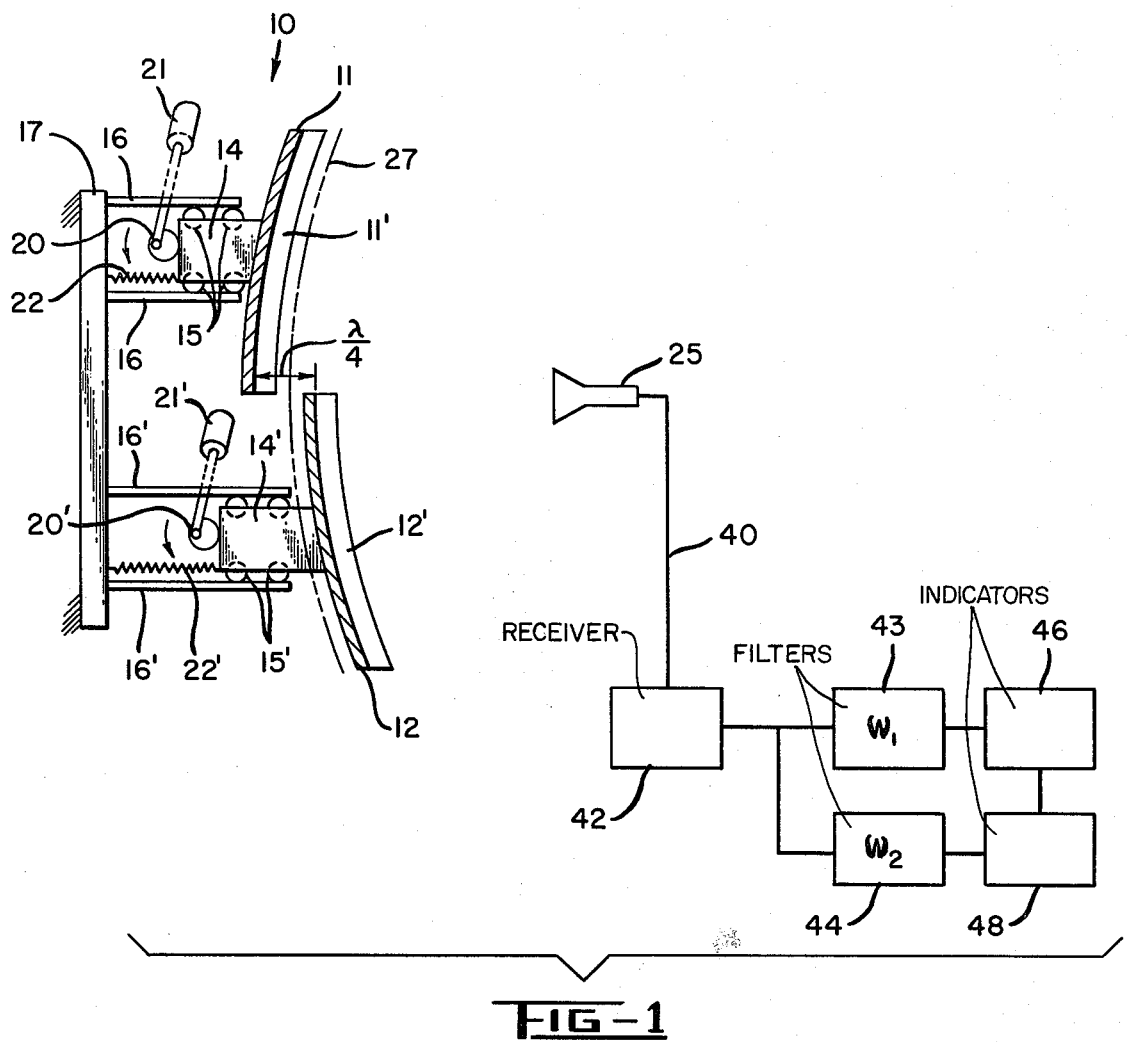

United States Patent [19]
Gamara

[11] 3,882,503
[45] May 6, 1975

[54] WAVE DETECTION APPARATUS
[75] Inventor: Norbert J. Gamara, Los Altos, Calif.
[73] Assignee: GTE Sylvania Incorporated, Mountain View, Calif.
[22] Filed: Aug. 17, 1960
[21] Appl. No.: 50,262

[52] U.S. Cl. .... 343/100 R; 343/18 D; 343/100 AM; 343/761; 343/839; 343/915
[51] Int. Cl. .............................................. G01s 1/00
[58] Field of Search ........... 343/761, 758, 914, 915, 343/18, 100, 111, 100 AM, 839

[56] References Cited
UNITED STATES PATENTS
2,821,701  1/1958  Vogeley, Jr. et al................. 343/7.4
2,917,740  12/1959  Ramsay............................. 343/111
FOREIGN PATENTS OR APPLICATIONS
642,385  7/1937  Germany ........................... 343/761

Primary Examiner—Maynard R. Wilbur
Assistant Examiner—Richard E. Berger
Attorney, Agent, or Firm—John F. Lawler; Norman J. O'Malley; Elmer J. Nealon

EXEMPLARY CLAIM

5. Wave detection apparatus comprising an antenna having at least two relatively movable wave reflecting surfaces adapted to reflect electromagnetic waves received from the same direction, said surfaces being spaced from each other along said direction by one-quarter of a wavelength at the operating frequency of the antenna, means to reciprocate said surfaces at relatively different rates, and means for receiving waves reflected from said surfaces and for discriminating between waves modulated at said different rates.

5 Claims, 2 Drawing Figures

INVENTOR.
NORBERT J. GAMARA
BY John F. Lawler
ATTORNEY

3,882,503

WAVE DETECTION APPARATUS

This invention relates to electromagnetic wave detection apparatus, and more particularly to such apparatus for detecting motion of an object in a direction transversely of the line of vision of an observing station. While the system is adapted to detect objects moving in any such transverse direction, for convenience and clarity the following description will concern vertically moving objects.

Vertical motion detection has been generally achieved in the past by a means of a combination of suitable antenna systems and associated receiver circuitry. The object whose measure of vertical motion is to be taken is detected by passive means, that is, a small portion of the target energy is collected by the vertical motion detection antenna rather than via radar techniques where scattered signals originally emanated from the radar are used to illuminate the target. Currently vertical motion detection is achieved generally by the use of two or more parabolic contour antennas which are substantially identical in size and configuration. One antenna is oriented at a slight angle with respect to the other so that the antenna beam axes make a slight vertical angle with respect to each other. A receiver connected to each separate antenna detects and indicates the passage of an object from one beam to another, thereby indicating the existence of vertical motion. This system, however, requires two or more separate antennas.

Another system which has been utilized is a single large antenna with two primary sources located in the focal plane of the antenna. One primary source is oriented at a slight vertical angle with respect to the other for generating a dual beam of the type described above. Since the two horns have finite size, it is impossible to locate them at the focal point of the antenna which reduces the efficiency of the system through reduction in gain and increase in side lobe structure.

In accordance with my invention, a split parabolic reflector and a single primary source are employed. The two half sections which make up the reflector proper are spaced from each other in the direction of the source by one quarter wavelength at the operating frequency. Each antenna section is separately mounted for translatory motion in the direction of the antenna beam, that is, toward and away from the primary source. This results in modulation of the received waves at the frequency of oscillation of the antenna sections. The upper and lower halves of the antenna are driven at different oscillatory rates, and therefore each modulates the incoming wave differently in accordance with its oscillating frequency. The receiver includes means, such as filters, for discriminating between the two modulating frequencies and therefore detects signals resulting from objects passing through the two vertically displaced beams of the antenna sections. Target or motion indication is given by sequential appearance of target signals on display devices associated with the two receiver demodulators or detectors.

A general object of my invention is the provision of a simplified antenna and receiving system for detecting moving objects.

A further object of the invention is the provision of an efficient detection system utilizing a dual beam antenna pattern and a single primary feed horn.

Figure 2:
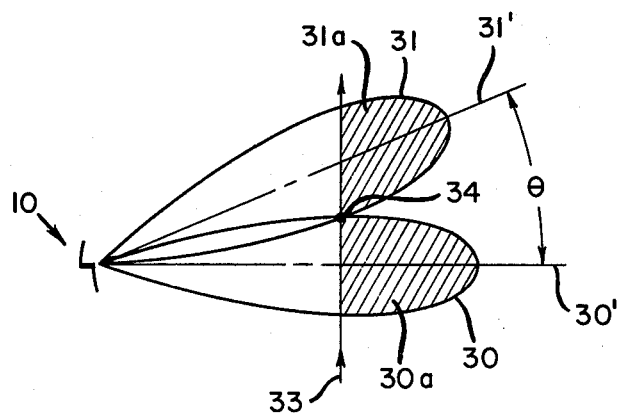

These and other objects of my invention will become apparent from the following description of a preferred embodiment thereof, reference being had to the accompanying drawings in which:

FIG. 1 is a schematic and block diagram of an antenna and receiver system embodying my invention; and FIG. 2 is a schematic representation of a dual beam antenna pattern which results from the antenna embodying my invention.

Referring now to the drawings, the antenna 10 comprises a split parabolic dish having an upper section 11 and a lower section 12 shown in cross section in FIG. 1. The antenna 10 preferably is designed to have a definitive pattern or beam in the vertical plane for sensing motion of targets in a generally vertical direction. Upper section 11 carries a rearwardly projecting bracket 14 supported by rollers 15 on guide rails 16 which are rigidly secured to a base 17. In order to move the upper antenna section 11 in an oscillatory pattern toward and away from the object to be detected, to the right and to the left as viewed in FIG. 1, an eccentric 20 engages the rear of bracket 14 and is rotated by a suitable means such as a motor 21. A spring 22 maintains contact between the surface of the eccentric and bracket 14. The frequency of forward and rearward movement of the antenna section 11 is dictated by the speed of rotation of motor 21 and is selected to have a predetermined value of $\omega_1$.

The lower antenna section 12 is mounted in a substantially identical manner as upper section 11, and like parts are indicated by the primes of the reference characters. Bracket 16' is engaged by eccentric 20' which is driven at an angular velocity $\omega_2$ by motor 21'. Thus the lower section 12 reciprocates at a predetermined frequency which is different from the reciprocating frequency of section 11.

The parabolic surfaces 11' and 12' of antenna sections 11 and 12 direct the electromagnetic waves that impinge upon them to a primary source, such as feed horn 25, located in front of the antenna. The upper and lower sections 11 and 12 are spaced apart in the forward direction by a distance equal to a quarter wavelength at the operating frequency of the system; that is, the mean average spacing between surface 11' and surface 12' of the respective sections is a quarter wavelength. Feed horn 25 is located at the focal point of a continuous parabolic surface represented by the broken line 27 which lies midway between the upper and lower reflecting surfaces 11' and 12'.

The action of the cams 20 and 20' on the antenna sections 11 and 12 causes an oscillating motion of each with respect to an arbitrary fixed point. The amplitude of the oscillation for both the upper and the lower sections preferably is small compared to their physical separation. The amplitude of these oscillations is kept small purposely to insure that the quarter wavelength spacing is not degraded since the beam bifurcation is dependent upon this spacing.

As a result of the quarter wavelength spacing of the upper and lower sections 11 and 12, the antenna has a pattern as shown in FIG. 2 comprising an upper beam 30 and a lower beam 31 having axes 30' and 31', respectively, disposed in the vertical plane at an angle $\theta$ with each other.

It can be shown that a Fourier transform pair $$(1) \quad G(u) = \int_{-\infty}^{\infty} F(x) \, e^{-j2\pi ux} dx$$

and $$(2) \quad F(x) = \left(\frac{1}{2\pi}\right)^{1/2} \int_{-\infty}^{\infty} G(u) \, e^{j2\pi ux} du$$

where $F(x)$ is the complex aperture distribution function $$F(x) = A(x) \, e^{j\psi(x)}$$

for a one-dimensional aperture, $A(x)$ being the amplitude distribution in the aperture and $\psi(x)$ being the phase of the amplitude distribution in the aperture, and where $u = -\sin\theta/\lambda$, $\theta$ is the diffraction space angle, $\lambda$ is the operating wavelength, $G(u)$ is the far field diffraction pattern, and $x$ is aperture coordinate. While the above transform pairs (1) and (2) are integrated over an infinite aperture, in reality the apertures are always finite. Accordingly, the expression for the far field may be rewritten as $$(3) \quad G(u) = \int_{-\frac{a}{2}}^{\frac{a}{2}} F(x) \, e^{-j2\pi ux} dx$$

for an aperture of total length $a$. The further assumption is made that the far field contribution from $-\infty$ to $-a/2$ and from $\infty$ to $a/2$ are zero in value.

To achieve a bifurcation of the antenna pattern or to generate two lobes or main beams, there must be a 180° phase discontinuity in the aperture focal plane. Such a discontinuity is expressed by the following:

$$\psi(x) = 0 \quad \text{for} \quad (-a/2 \leq x \leq 0) \quad (4)$$

$$\psi(x) = \pi \quad \text{for} \quad (0 \leq x \leq a/2) \quad (5)$$

It should be noted that in physical form this discontinuity is achieved by translating the parabolic section an amount $\lambda/2$ or 180 electrical degrees in the plane of symmetry of the parabolic contour.

Under conditions (4) and (5) the Fourier transform $G(u)$ in expression (3) gives $$(6) \quad G(u) = a \, \frac{(1 - \cos(\pi au))}{\pi au}$$

thus proving the theoretical generation of a dual radiation beam.

A practical way of generating the dual beam is to segment the parabolic contour, denoted by the expression $$Y^2 = 4f(x) \quad (7)$$

by setting back the upper section 11 from the lower section 12 as indicated in FIG. 1. When each section is oscillated at a different frequency, for example, section 11 at 20 cycles per second and section 12 at 35 cycles per second, a modulation is applied to the pattern associated with each section according to the angular velocity of drive means 21 and 21'. Detected energy radiated from an object passing through the beams 30 and 31 along a path such as indicated by the arrowed line 33 in FIG. 2 is modulated in the shaded area 30a at the frequency $\omega_2$ and to a considerably lesser extent in the crosshatched area designated 31a. As the path 33 passes the beam crossover point 34, the intensity of modulation of the received signal at both $\omega_1$ and $\omega_2$ is the same, indicating that the beam crossover point has been reached by the ascending radiating target. Accordingly the energy received in filter sensitive to the modulated frequency $\omega_1$ typified by the crosshatched area 31a is increasing while simultaneously the energy available to the filter sensitive to frequency $\omega_2$ is diminishing. The display of this varying output from the two filters indicates the presence of vertical motion detection. It should be noted that the level of the crossover point 34 shown in FIG. 2 is purely arbitrary and is a matter of design criteria which can be adjusted for a particular antenna performance. This permits discrimination between the vertical positions of the object depending upon the value of the modulating frequency.

The signal received by antenna horn 25 is carried by line 40 to a receiver head 42 which amplifies the signal and passes it to frequency filters 43 and 44. Filter 43 has a pass band corresponding to $\omega_1$ and filter 44 has a similar pass band corresponding to $\omega_2$. When an object to be detected is in the shaded area 30a, see FIG. 2, signals received from it by the antenna are modulated at the rate of frequency $\omega_2$ which is passed by filter 44 and appears as a visual indication at display panel 48. Similarly, when the objects reaches shaded area 31a, the signal it radiates is modulated at the rate of $\omega_1$ which is blocked by filter 44 but which is passed by filter 43 to panel display 46. If display units 46 and 48 are oscilloscopes, by way of example, the indication of the presence of an object moving up in the vertical plane is a pip appearing first in the lower scope 48 and shortly thereafter another pip appearing in the upper scope 46.

Changes and modifications may be made to the above described embodiment of my invention by those skilled in the art without departing from the spirit and scope of the invention. The appended claims define the essential features of novelty in the invention.

I claim:

1. Wave detection apparatus comprising a parabolic antenna having an upper half section and a separate lower half section, a feed horn disposed substantially at the focal point of said antenna, means for supporting said upper antenna section for reciprocating movement toward and away from said feed horn at a first frequency, means for supporting said lower section for reciprocating movement toward and away from said feed horn at a second frequency different from said first frequency, said upper and lower sections being spaced apart in the direction toward the feed horn by one-quarter wavelength at the antenna operating frequency, and receiver means connected to said feed horn, said receiver means comprising a first frequency filter adapted to pass signals at said first frequency and to block signals at the second frequency, a second frequency filter adapted to pass signals at the second frequency and to block signals at the first frequency, and signal indicator means connected to the outputs of said first and second filters.

2. Wave detection apparatus comprising an antenna having an upper section and a separate lower section, a feed horn disposed on one side of the antenna for receiving electromagnetic energy reflected by said antenna, means for supporting said upper antenna section for reciprocating movement toward and away from said feed horn at a first frequency, means for supporting said lower section for reciprocating movement toward and away from said feed horn at a second frequency different from said first frequency, said upper and lower sections being spaced apart in the direction toward the feed horn by one-quarter wavelength at the antenna operating frequency, and receiver means connected to said feed horn, said receiver means comprising a first frequency filter adapted to pass signals at said first frequency and to block signals at the second frequency, a second frequency filter adapted to pass signals at the second frequency and to block signals at the first frequency, and signal indicator means connected to the outputs of said first and second filters.

3. Wave detection apparatus adapted to receive electromagnetic energy from a remote object, comprising an antenna having an upper section and a separate lower section, means for supporting said upper antenna section for reciprocating movement in a direction toward and away from said object at a first frequency, means for supporting said lower section for reciprocating movement toward and away from said object at a second frequency different from said first frequency, said upper and lower sections being spaced apart in the direction toward the object by one-quarter wavelength at the antenna operating frequency, and receiver means arranged to receive electromagnetic waves intercepted by said antenna comprising frequency discriminating means for separating electromagnetic waves modulated at said first and second frequencies, respectively, and indicator means connected to the output of said frequency discriminating means.

4. Electromagnetic wave detection apparatus comprising a parabolic antenna having an upper section and a separate lower section, a feed horn disposed substantially at the focal point of said antenna, means for supporting said upper antenna section for reciprocating movement toward and away from said feed horn at a first frequency, means for supporting said lower section for reciprocating movement toward and away from said feed horn at a second frequency different from said first frequency, said upper and lower sections being spaced apart in the direction toward the feed horn by one-quarter wavelength at the antenna operating frequency, and receiver means connected to said feed horn comprising frequency discriminating means adapted to separate electromagnetic waves modulated at said first and second frequencies, respectively, and indicator means connected to the output of said frequency discriminating means for indicating the reception of said separated waves.

5. Wave detection apparatus comprising an antenna having at least two relatively movable wave reflecting surfaces adapted to reflect electromagnetic waves received from the same direction, said surfaces being spaced from each other along said direction by one-quarter of a wavelength at the operating frequency of the antenna, means to reciprocate said surfaces at relatively different rates, and means for receiving waves reflected from said surfaces and for discriminating between waves modulated at said different rates.

* * * * *